US009669649B2

(12) United States Patent
Izawa et al.

(10) Patent No.: US 9,669,649 B2
(45) Date of Patent: Jun. 6, 2017

(54) MECHANICAL PENCIL

(71) Applicant: MITSUBISHI PENCIL COMPANY, LIMITED, Tokyo (JP)

(72) Inventors: Hirotake Izawa, Yokohama (JP); Daisaku Morimoto, Yokohama (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 78 days.

(21) Appl. No.: 14/376,541

(22) PCT Filed: Feb. 20, 2013

(86) PCT No.: PCT/JP2013/054107

§ 371 (c)(1),
(2) Date: Aug. 4, 2014

(87) PCT Pub. No.: WO2013/129198

PCT Pub. Date: Sep. 6, 2013

(65) Prior Publication Data

US 2015/0050061 A1 Feb. 19, 2015

(30) Foreign Application Priority Data

Feb. 27, 2012 (JP) ................................ 2012-040399

(51) Int. Cl.
*B43K 21/22* (2006.01)
*B43K 21/00* (2006.01)
(Continued)

(52) U.S. Cl.
CPC .............. *B43K 21/16* (2013.01); *B43K 21/00* (2013.01); *B43K 21/006* (2013.01); *B43K 21/06* (2013.01);
(Continued)

(58) Field of Classification Search
CPC ...... B43K 21/16; B43K 21/006; B43K 21/00; B43K 21/06; B43K 29/02; B43K 29/00; B43K 21/22; B43K 23/008; B43K 23/02
(Continued)

(56) References Cited

U.S. PATENT DOCUMENTS 3,539,269 A * 11/1970 Dahle ...................... B43K 8/18 401/259
7,802,936 B1 * 9/2010 Izawa .................. B43K 21/003 401/194
(Continued)

FOREIGN PATENT DOCUMENTS

EP 2 033 806 A1 3/2009
EP 2 218 586 A1 8/2010
(Continued)

OTHER PUBLICATIONS

Extended Search Report dated Sep. 22, 2015, issued in counterpart European Patent Application No. 13755241.0. (6 pages).
(Continued)

*Primary Examiner* — David Walczak
*Assistant Examiner* — Thomas M Abebe
(74) *Attorney, Agent, or Firm* — Westerman, Hattori, Daniels & Adrian, LLP

(57) ABSTRACT

Cam faces 24*a* and 24*b* are continuously formed in a circle on upper and lower faces which are perpendicular to an axial direction of a rotatable cam 24 which constitutes a rotational drive mechanism 21. Elastic members 23*b* are formed integrally with a holder member 23 for rotatably supporting the rotatable cam 24 to extend in the axial direction, and the first fixed cam and second fixed cam 23*c* and 23*d* having a small number of cam faces at butts and tips of the elastic members are arranged to face each other via the upper and lower cam faces 24*a* and 24*b* of the rotatable cam 24. The
(Continued)

rotatable cam 24 is retreated and moved forward in the axial direction by writing pressure applied to a writing lead to be rotationally driven in one direction and rotational motion of the rotatable cam 24 is transmitted to the writing lead.

9 Claims, 8 Drawing Sheets

(51) Int. Cl.

| | |
|---|---|
| ***B43K 21/16*** | (2006.01) |
| ***B43K 8/00*** | (2006.01) |
| ***A45D 40/26*** | (2006.01) |
| ***A46B 11/00*** | (2006.01) |
| ***B43K 21/14*** | (2006.01) |
| ***B29C 45/00*** | (2006.01) |
| ***B43K 21/06*** | (2006.01) |
| ***B43K 23/008*** | (2006.01) |
| ***B43K 29/02*** | (2006.01) |
| ***B43K 23/02*** | (2006.01) |
| ***B43K 29/00*** | (2006.01) |

(52) U.S. Cl.
CPC ............ *B43K 21/22* (2013.01); *B43K 23/008* (2013.01); *B43K 23/02* (2013.01); *B43K 29/00* (2013.01); *B43K 29/02* (2013.01)

(58) Field of Classification Search
USPC ......................................... 401/92, 60, 65–70
See application file for complete search history.

(56) References Cited

U.S. PATENT DOCUMENTS

| | | | | | |
|---|---|---|---|---|---|
| 9,314,810 | B2 * | 4/2016 | Uehara | B05C 1/00 | |
| 2004/0020811 | A1 * | 2/2004 | Yamanaka | A45D 40/04 | 206/385 |
| 2009/0180824 | A1 * | 7/2009 | Izawa | B43K 21/00 | 401/66 |
| 2010/0166486 | A1 * | 7/2010 | Izawa | B43K 21/22 | 401/66 |
| 2010/0266325 | A1 * | 10/2010 | Izawa | B43K 21/003 | 401/93 |
| 2010/0322695 | A1 * | 12/2010 | Ohsawa | B43K 21/003 | 401/65 |
| 2011/0002728 | A1 | 1/2011 | Izawa et al. | | |
| 2014/0016982 | A1 * | 1/2014 | Izawa | B43K 21/00 | 401/68 |
| 2015/0023714 | A1 * | 1/2015 | Izawa | B43K 21/16 | 401/65 |
| 2015/0050061 | A1 * | 2/2015 | Izawa | B43K 21/16 | 401/65 |
| 2015/0063893 | A1 * | 3/2015 | Oomoto | B43K 23/008 | 401/62 |
| 2015/0336419 | A1 * | 11/2015 | Oomoto | B43K 21/00 | 401/87 |

FOREIGN PATENT DOCUMENTS

| | | | | |
|---|---|---|---|---|
| EP | 2 241 449 | A1 | | 10/2010 |
| JP | 2009-160736 | A | | 7/2009 |
| JP | 2010-120204 | A | | 6/2010 |
| JP | 2010120204 | A | * | 6/2010 |
| WO | 2007/142135 | A1 | | 12/2007 |
| WO | 2011/067912 | A1 | | 6/2011 |

OTHER PUBLICATIONS

International Search Report dated Apr. 9, 2013, issued in corresponding application No. PCT/JP2013/054107.

* cited by examiner (A)

(B)

(A)

(B)

(A)

(B)

(A)

(B)

MECHANICAL PENCIL

TECHNICAL FIELD

The present invention relates to a mechanical pencil which can rotate, for example, a writing lead (refill lead) using writing pressure, and in particular to improvement of a rotational drive mechanism for rotationally driving the writing lead etc.

BACKGROUND ART

As is well known, a mechanical pencil has a problem that a drawn line becomes bold, since a writing lead may locally abrade as the writing proceeds.

Then, the present applicant has previously proposed a mechanical pencil provided with a rotational drive mechanism in which the writing lead is gradually rotated in one direction using writing pressure applied to the writing lead. This is disclosed in Patent Documents 1 and 2 etc.

According to this mechanical pencil, in the case where a body cylinder is inclined to a writing side (page) at around 40 to 80 degrees (for example), every time a stroke is drawn, the writing lead is slightly rotationally driven in one direction, so that a tip portion of the writing lead is always kept sharp in the shape of a cone. Thus, it is possible to write down and always give substantially the same line width.

Prior Art Documents

Patent Documents

Patent Document 1: International Publication WO 2007/142135

Patent Document 2: Japanese Patent Application Publication No. 2009-160736

SUMMARY OF THE INVENTION

Problems to be Solved by the Invention

Incidentally, the rotational drive mechanism for the writing lead used for the above-mentioned conventional mechanical pencil is provided with a rotatable cam which is moved axially by writing pressure and a first and second fixed cams which face each other via upper and lower (in axial direction) cam faces of this rotatable cam.

Further, a structure is employed in which the cam faces in the shape of a saw tooth are continuously formed in a circle on both the upper and lower (in the axial direction) faces of the above-mentioned rotatable cam. Further, in the above-mentioned first and the second fixed cams, cam faces in the shape of a saw tooth are continuously formed in a circle on a first and second cylindrically shaped fixed cam formation members, and the above-mentioned two fixed cam formation members are positioned and arranged coaxially.

According to the rotational drive mechanism for the above-mentioned writing lead, the cam faces in the shape of a saw tooth are continuously formed in a circle on both the upper and lower faces of the rotatable cam, and the first and second fixed cams, and it has a three-component structure in which the above-mentioned rotatable cam, and the respective fixed cam formation members for forming the first and second fixed cam are combined.

Further, since it has two fixed cam formation members, it is necessary to form a positioning mechanism (for example, of protrusions) between both the fixed cam formation members so that cam pitches of the first and second cam faces which are continuous in a circle can secure a particular relationship in a circumferential direction.

According to this structure, mold variations between the cam face of the first fixed cam and the above-mentioned positioning mechanism, mold variations between the cam face of the second fixed cam and the above-mentioned positioning mechanism, the clearance of the above-mentioned positioning mechanism of protrusions, and the like act synergistically, and it is very difficult to secure the accuracy of meshing with the cam face in the rotational drive mechanism.

The present invention has been made in order to solve the problem in the rotational drive mechanism employed for the above-mentioned mechanical pencil, and aims to provide a mechanical pencil which allows the cam structure to be simplified, the number of components to be reduced, the accuracy of meshing with the cam face to be improved, and the rotational drive mechanism to be easily assembled.

Means for Solving the Problems

The present invention made in order to solve the above-mentioned problem is a mechanical pencil having a rotational drive mechanism for rotationally driving a rotatable cam based on writing pressure applied to a writing lead and arranged to use rotational motion of the above-mentioned rotatable cam, wherein the above-mentioned rotatable cam which constitutes the above-mentioned rotational drive mechanism retreats in an axial direction based on the writing pressure applied to the above-mentioned writing lead and is moved forward in the axial direction by releasing the above-mentioned writing pressure, a large number of cam faces are continuously formed in a circle on upper and lower faces of the above-mentioned rotatable cam, the upper and lower faces being perpendicular to the axial direction, the above-mentioned rotational drive mechanism further comprises a first fixed cam and a second fixed cam which are arranged to face each other via the upper and lower cam faces of the above-mentioned rotatable cam, the above-mentioned first fixed cam comprises a small number of cam faces which mesh with a part of the large number of upper cam faces of the above-mentioned rotatable cam so as to rotationally drive the above-mentioned rotatable cam in one direction as the above-mentioned rotatable cam retreats in the axial direction, and the above-mentioned second fixed cam comprises a small number of cam faces which mesh with a part of the large number of lower cam faces of the above-mentioned rotatable cam so as to rotationally drive the above-mentioned rotatable cam in the above-mentioned one direction as the above-mentioned rotatable cam moves forward in the axial direction.

In this case, in the preferred embodiment, a structure is employed in which the above-mentioned first fixed cam and second fixed cam are formed integrally with a holder member.

More preferably, a structure is employed in which elastic members are formed at the above-mentioned holder member to extend in the axial direction, and the above-mentioned first fixed cam and second fixed cam are formed integrally with part of the above-mentioned elastic members in a longitudinal direction.

On the other hand, it is desirable that cam peaks of the above-mentioned first fixed cam and second fixed cam are formed to be in alignment with each other in the axial direction. In addition, it is preferable that a cylindrical portion for rotatably supporting the above-mentioned rotatable cam is formed at the above-mentioned holder member.

Effects of the Invention

As described above, according to the mechanical pencil in accordance with the present invention, since it is arranged that the first and second fixed cams are each provided with a small number of cam faces which mesh with a part of a large number of cam faces provided at the upper and lower faces of the rotatable cam, it is possible to simplify the cam structure.

Further, since the first and second fixed cams are formed integrally with the holder member, it is possible to reduce the number of components. In addition, since the integral formation can improve the accuracy of relative positions of the first and second fixed cams, it is possible to contribute to improvement in accuracy of the meshing of the cam face and the rotatable cam.

Furthermore, since a structure is employed in which the elastic members are formed at the above-mentioned holder member to extend in the axial direction, and the above-mentioned first fixed cam and second fixed cam are formed integrally with part of the above-mentioned elastic members in the longitudinal direction. Thus, it is easy to mount the above-mentioned rotatable cam to the holder member taking advantage of the function of the above-mentioned elastic members, and the rotational drive mechanism is allowed to be easily assembled.

BEST MODE FOR CARRYING OUT THE INVENTION

A mechanical pencil in accordance with the present invention will be described with reference to the preferred embodiment where a writing lead is rotationally driven by writing pressure. It should be noted that, in each of the drawings as illustrated below, like parts are referred to by like reference signs, but reference signs are assigned to typical parts in some drawings, and the detailed structures may be described with reference to reference signs used in other drawings for the sake of brevity.

Figure 1:
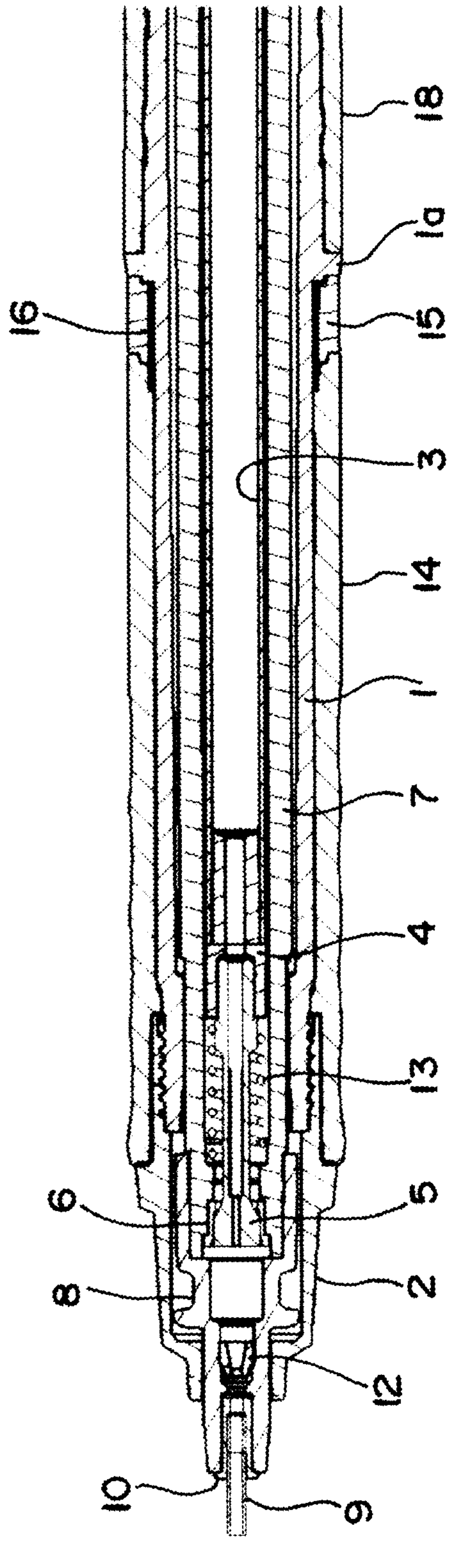
FIG. 1 is a sectional view showing a first half part of a mechanical pencil in accordance with the present invention.
Figure 2:
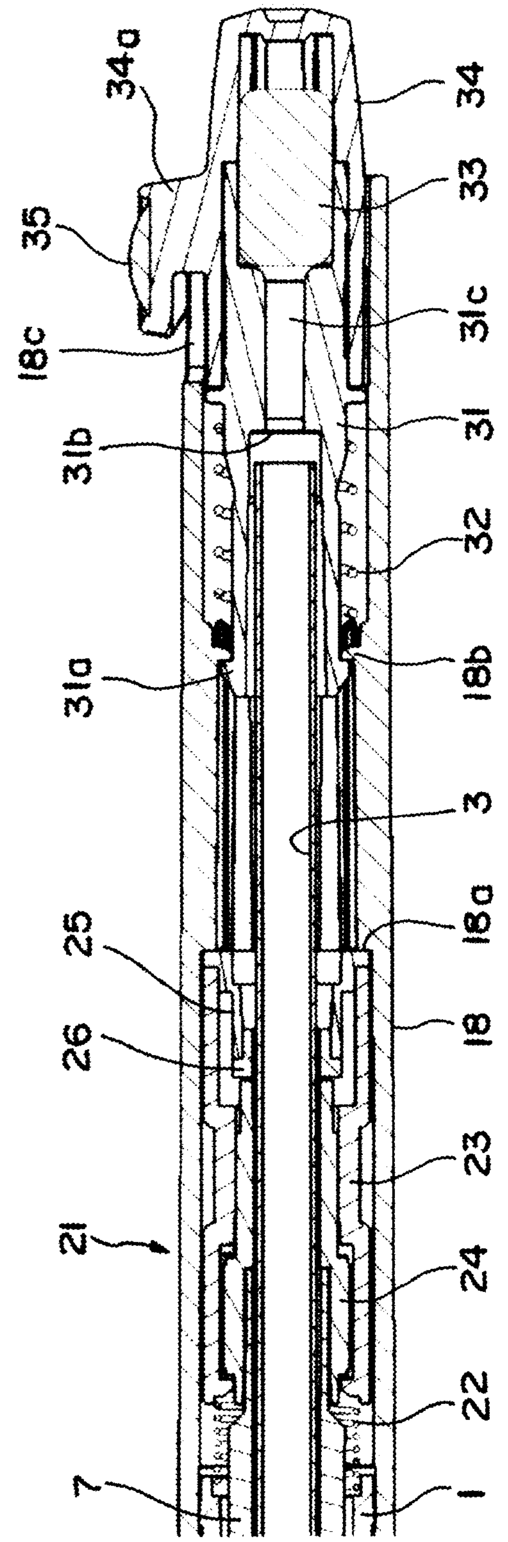
FIG. 2 is a sectional view similarly showing a second half part.

FIGS. 1 and 2 describe the general structure of the mechanical pencil which is separated into the first half part and the second half part. Firstly in FIG. 1, a base member 2 is threadedly connected with a tip portion of a front body 1 which constitutes a body cylinder so as to be detachable from the front body 1. A cylindrical lead case 3 is accommodated along an axis of the above-mentioned front body 1 and a rear body to be described below, and a short lead case connector 4 is attached to the tip portion of this lead case 3 to which a chuck 5 made of brass is connected through the above-mentioned lead case connector 4.

In the above-mentioned chuck 5, a through hole (not shown) for the writing lead is formed along the axis. Further, a tip portion is divided into a plurality of pieces (three pieces, for example), and the divided tip pieces are loosely fitted in a brass clamp 6 formed in the shape of a ring. Furthermore, the above-mentioned ring-shaped clamp 6 is fitted within a tip portion of a connection pipe 7 arranged to surround the perimeter of the above-mentioned chuck 5.

It should be noted that a rear end portion of this connection pipe 7 is connected to the rotational drive mechanism to be described below in which the writing lead (refill lead) is rotated by the writing pressure.

At a front end portion of the above-mentioned connection pipe 7, a cylindrical slider 8 which is accommodated in the above-mentioned base member 2 and whose front end portion projects from the base member 2 is fitted and attached to the connection pipe 7. Further, a pipe end 9 which guides the writing lead is attached to the front end portion of the slider 8 via a pipe holder 10. Furthermore, a holder chuck 12 made of rubber in which a through hole is formed at an axial portion is accommodated immediately behind the pipe holder 10 at an inner periphery of the above-mentioned slider 8.

With the above-mentioned structure, a linear lead inserting hole is formed which reaches the pipe end 9 via the through hole formed in the chuck 5 which is linked to the lead case 3 and via the through hole formed along the axis of the above-mentioned holder chuck 12. The writing lead (not shown) is inserted into this linear lead inserting hole. Further, a coil-like chuck spring 13 is provided between the above-mentioned connection pipe 7 and the lead case connector 4.

That is to say, a front end portion of the above-mentioned chuck spring 13 abuts an annular step portion formed at an inner periphery of the connection pipe 7, and a rear end portion of the chuck spring 13 is accommodated in abutment with a front end face of the above-mentioned lead case connector 4. Therefore, the above-mentioned chuck 5 is retreated in the connection pipe 7 by the action of the above-mentioned chuck spring 13 and biased in a direction to accommodate its tip portion in the ring-shaped clamp 6, i.e., in a direction to grip the writing lead.

A grip member 14 formed of an elastic material, such as for example rubber, is provided for the above-mentioned front body 1 which constitutes the body cylinder so as to surround the front body 1. When fitting this grip member 14 to the front body 1, a transparent ring 15 formed of a transparent resin material and functioning as a decorative ring is fitted first from the tip portion side of the front body 1.

This transparent ring 15 is positioned by an annular flange 1*a* which is formed integrally with the front body. Subsequently, the above-mentioned grip member 14 is fitted from the same side to surround the front body 1. Then, the above-mentioned base member 2 is threadedly engaged with the front end portion of the front body 1, so that the above-mentioned transparent ring 15 and the grip member 14 are attached to the above-mentioned front body 1 and prevented from moving out thereof in the axial direction, The above-mentioned transparent ring 15 which functions as the decorative ring is arranged to cover a decorative seal

16 which is adhered to and wraps around the front body 1 in advance so that the periphery of this seal 16 can be viewed. This decorative seal 16 is printed with a glossy pattern, such as gold and silver, and a transparent part where printing is not carried out is formed in a proper position. Further, it is arranged that a part of the internal connection pipe 7 can be viewed through this transparent part and the above-mentioned front body 1 formed of a transparent resin material.

Thus, it is possible to see through the transparent ring 15 how the connection pipe 7 is rotationally driven by the rotational drive mechanism to be described below.

An inner surface of the front end portion of a rear body 18 which constitutes the body cylinder is fitted and attached to a rear end portion of the above-mentioned front body 1. As shown in FIG. 2, the rotational drive mechanism 21 for the writing lead is accommodated in the first half portion of the rear body 18.

As described above, the rear end portion of the connection pipe 7 is connected to this rotational drive mechanism 21. According to writing operation, this connection pipe 7 is subjected to the slight retreat and advance operation (cushion operation) of the writing lead through the above-mentioned chuck 5 and the motion is transmitted to the rotational drive mechanism 21 so that the rotational motion produced by the cushion operation in the above-mentioned rotational drive mechanism 21 may be transmitted to the above-mentioned chuck 5 through the above-mentioned connection pipe 7.

Thus, the writing lead (not shown) gripped by the chuck 5 is subjected to the rotational motion of the above-mentioned rotational drive mechanism 21 in conjunction with the writing operation.

It should be noted that the above-mentioned rotational drive mechanism 21 is biased rearwardly at its front end portion by the body spring 22 interposed between the mechanism 21 and the above-mentioned front body 1. Further, the bias force of the above-mentioned body spring 22 brings a rear end portion of the rotational drive mechanism 21 into abutment with a step portion 18*a* formed by reducing the diameter within the above-mentioned rear body 18.

That is to say, in this preferred embodiment, the above-mentioned rotational drive mechanism 21 is restricted from rotating by friction caused by the abutment against the step portion 18*a* within the rear body 18 so that the above-mentioned rotational drive mechanism 21 may act to transmit the rotational motion produced by the above-mentioned cushion operation to the above-mentioned chuck 5 side.

The outside of the above-mentioned rotational drive mechanism 21 is constituted by a holder member 23. A cylindrically formed rotatable cam 24 is rotatably fitted in this holder member 23. Further, the above-mentioned connection pipe 7 is fitted and linked to an inner periphery of the above-mentioned rotatable cam 24 at a front end portion of the rotational drive mechanism 21.

Further, the above-mentioned holder member 23 is provided with a cushion member 25 made of rubber, and a torque canceller 26 is attached through this cushion member 25. The above-mentioned torque canceller 26 comes into abutment with a rear end portion of the above-mentioned rotatable cam 24 on the opposite side of the cushion member 25, so that the elasticity of the above-mentioned cushion member 25 acts to push out the above-mentioned rotatable cam 24 forwards.

It should be noted that the above-mentioned rotatable cam 24, the cushion member 25, and an inner periphery of the torque canceller 26 provide a space through which the above-mentioned lead case 3 passes, whereby the rotational drive mechanism 21 is isolated from the lead case 3.

The above-mentioned rotational drive mechanism 21 is provided with the above-mentioned holder member 23, the rotatable cam 24, the cushion member 25, the torque canceller 26, etc., which are made into a unit. A structure of this unit of the rotational drive mechanism 21 will be described in detail later with reference to FIGS. 3 to 8.

The second half portion of the above-mentioned rear body 18 i.e., the rear portion side of the rotational drive mechanism 21 is provided with a knock bar 31 which is slidable in the axial direction. A front end portion of this knock bar 31 is formed as an annular wedge-like protrusion 31*a*. This wedge-like protrusion 31*a* passes over and is attached to an annular projection 18*b* formed in the rear body 18.

Further, it is arranged that a coil-like knock bar spring 32 is disposed between the annular projection 18*b* and the knock bar 31 so that this spring 32 may urge the above-mentioned knock bar 31 towards a rear end portion side of the rear body 18.

Further, an abutting portion 31*b* provided with a writing lead feeding hole 31*c* is formed somewhat closer to the rear end portion away from the center of the knock bar 31. Furthermore, an eraser 33 is detachably fitted in the rear end portion of this knock bar 31, and a knock cover 34 which covers the above-mentioned eraser 33 is detachably fitted to the periphery of the rear end of the knock bar 31.

It should be noted that the abutting portion 31*b* of the above-mentioned knock bar 31 and the rear end portion of the above-mentioned lead case 3 are arranged to face each other at a predetermined distance. According to this structure, even if the chuck 5 and the lead case 3 are retreated a little by the above-mentioned cushion operation of writing, the rear end portion of the lead case 3 does not impact the abutting portion 31*b* of the above-mentioned knock bar 31, and the rotation operation of the above-mentioned rotational drive mechanism 21 can be prevented from being affected.

In the above-mentioned knock cover 34 which is detachably attached to the above-mentioned knock bar 31, a disk-shaped projection 34*a* is integrally formed at a side wall of this knock cover 34. Further, a disk side of the disk-shaped projection 34*a* is provided with a thick resin seal 35 whose central part is circular and a little convex and which has a different color from that of the above-mentioned knock cover 34.

A slot 18*c* is formed in the axial direction at a part of a circumference of the rear end portion of the above-mentioned rear body 18. It is arranged that the above-mentioned disk-shaped projection 34*a* is provided along the above-mentioned slot 18*c*, so that the knock operation of the above-mentioned knock cover 34 may be attained.

In addition, it follows that the disk-shaped projection 34*a* formed at the above-mentioned knock cover 34 allows the above-mentioned thick resin seal 35 to function as a decoration and also functions as a stopper for preventing the mechanical pencil from rolling.

In the above structure, as the above-mentioned knock cover 34 is knocked, the abutting portion 31*b* of the knock bar 31 pushes out the lead case 3 forward, and a part of the slider 8 attached to the connection pipe 7 comes into abutment with the base member 2, thus being restricted from moving forward. Therefore, the tip portion of the chuck 5 projects relatively from the clamp 6, and the state where the writing lead is gripped by the chuck 5 is canceled. As the above-mentioned knock operation is released, the lead case 3 and the chuck 5 are retreated in the body cylinder by the action of the chuck spring 13.

At this time, the writing lead is temporarily held by friction in the through hole formed in the holder chuck 12. In this situation, as the chuck 5 retreats, its tip portion is accommodated in the above-mentioned clamp 6, thus the writing lead again turns into the gripping state. That is to say, as the chuck 5 is moved forward and backward by repeating the knock operation of the knock cover 34, the writing lead is gripped and released, thus the writing lead is gradually inched forward from the chuck 5.

Figure 3:
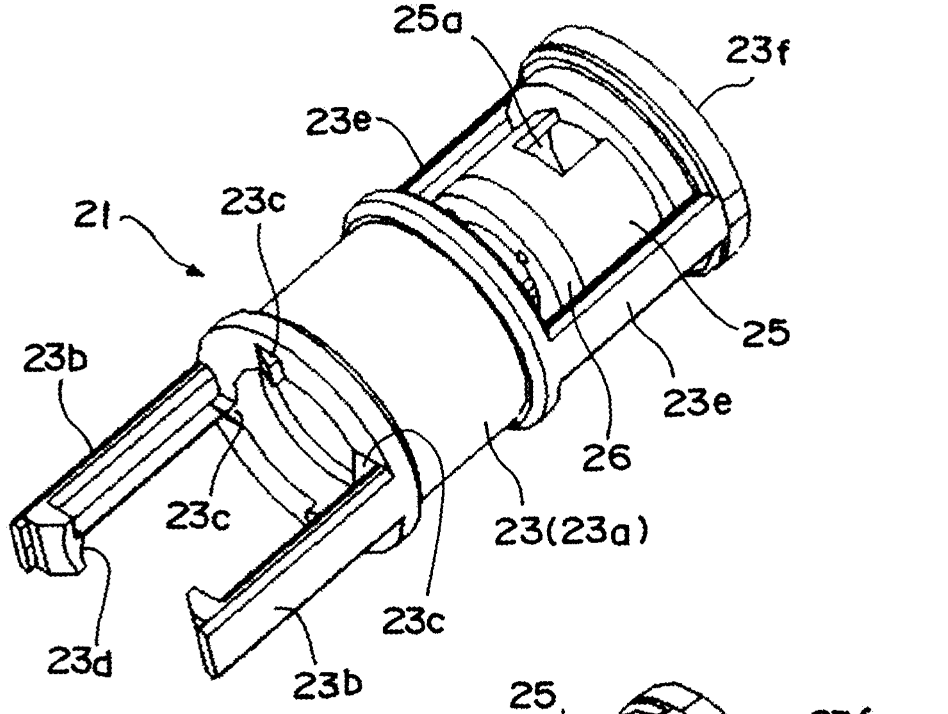
FIG. 3 are perspective views showing a rotational drive mechanism omitting a rotatable cam.
Figure 3:
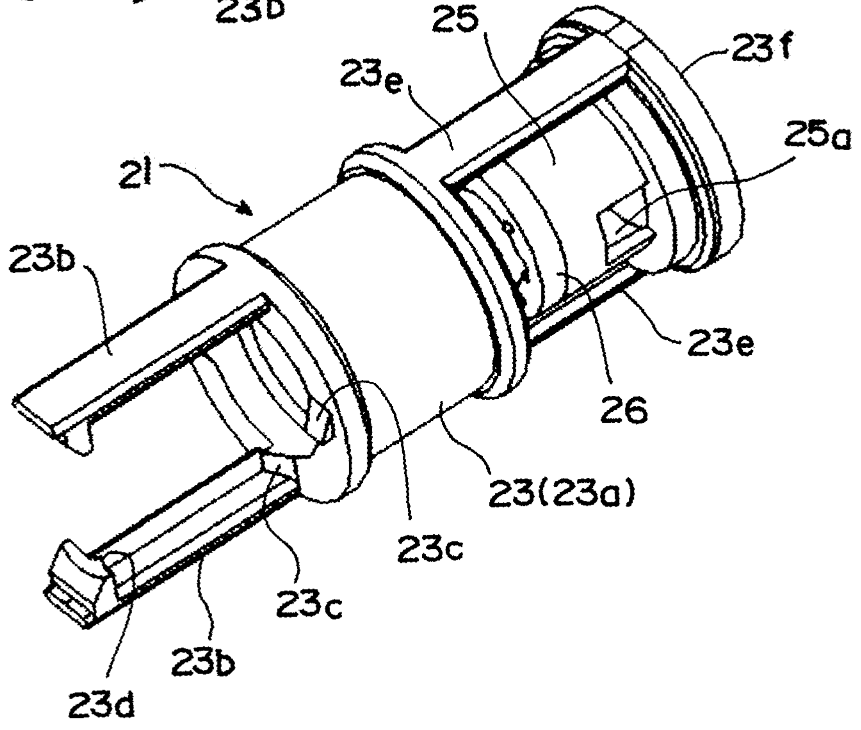
Figure 4:
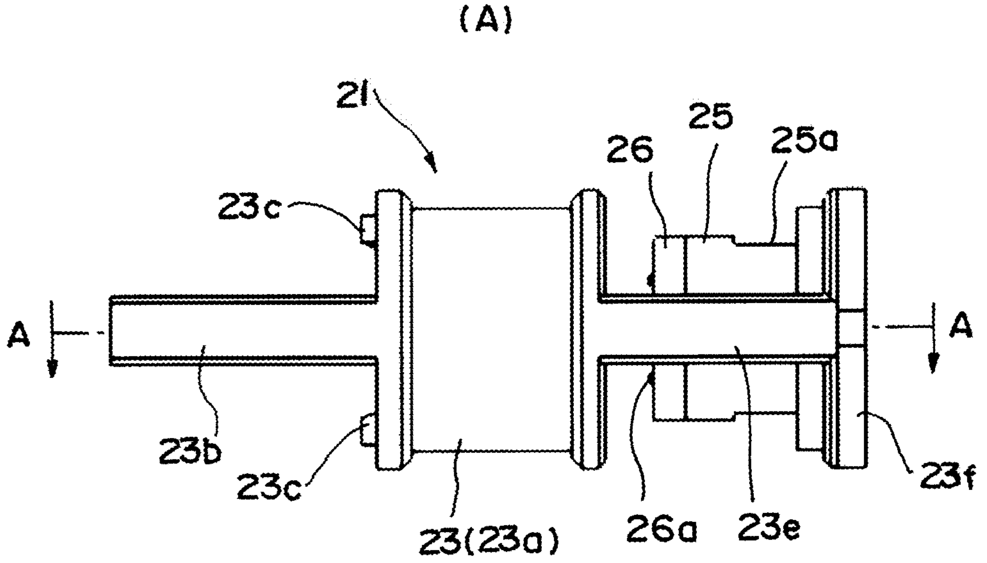
FIG. 4 are a front view and a top view of the rotational drive mechanism shown in FIG. 3.
Figure 4:
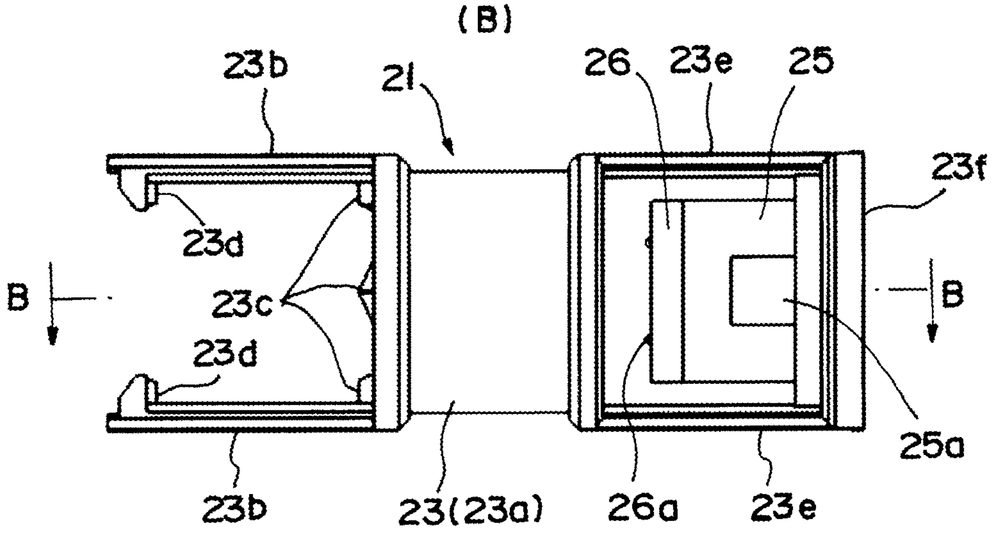
Figure 5:
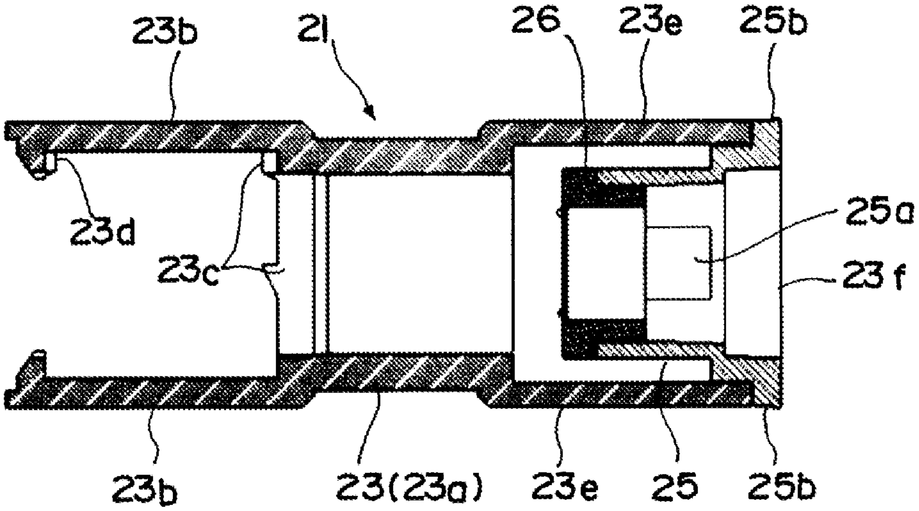
FIG. 5 are sectional views taken in the direction of the arrows along the lines A-A and B-B shown in FIG. 4.
Figure 5:
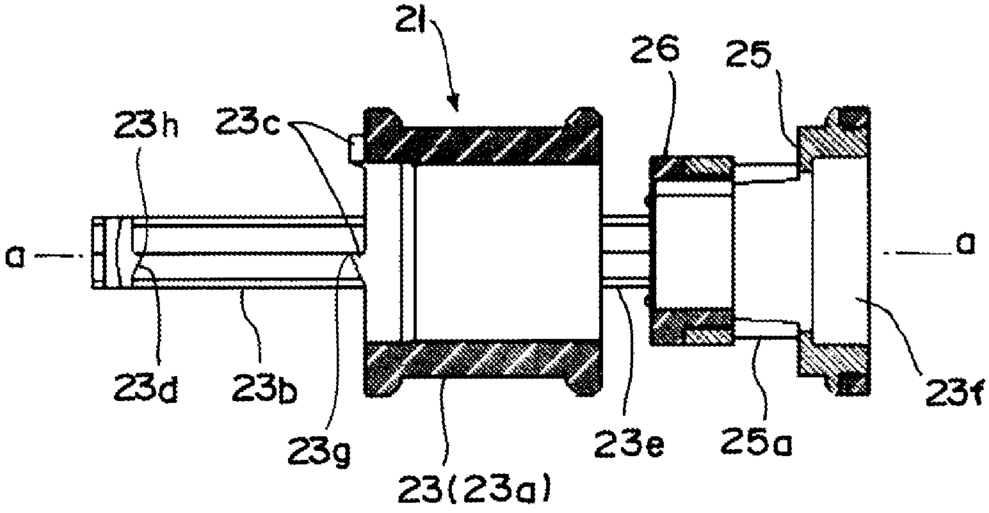
Figure 6:
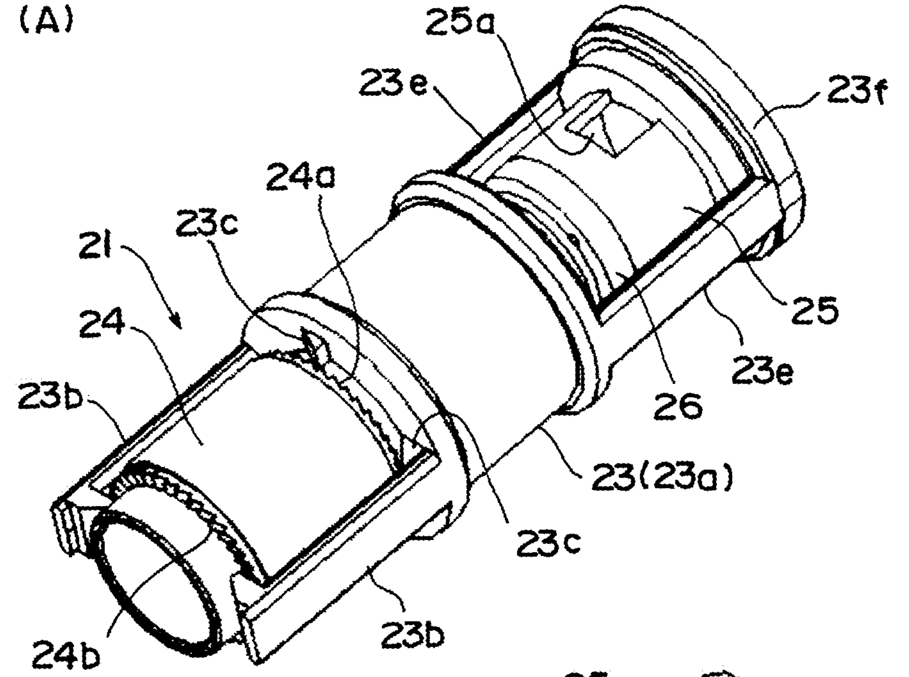
FIG. 6 are perspective views showing an apparent structure of the rotational drive mechanism where the rotatable cam is mounted.
Figure 6:
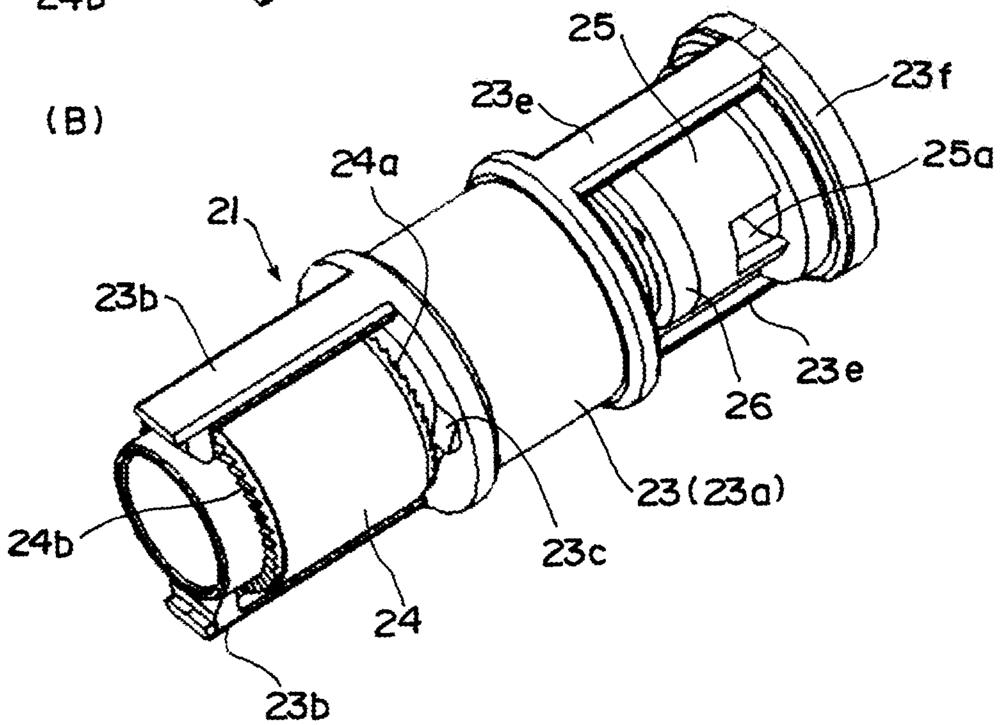
Figure 7:
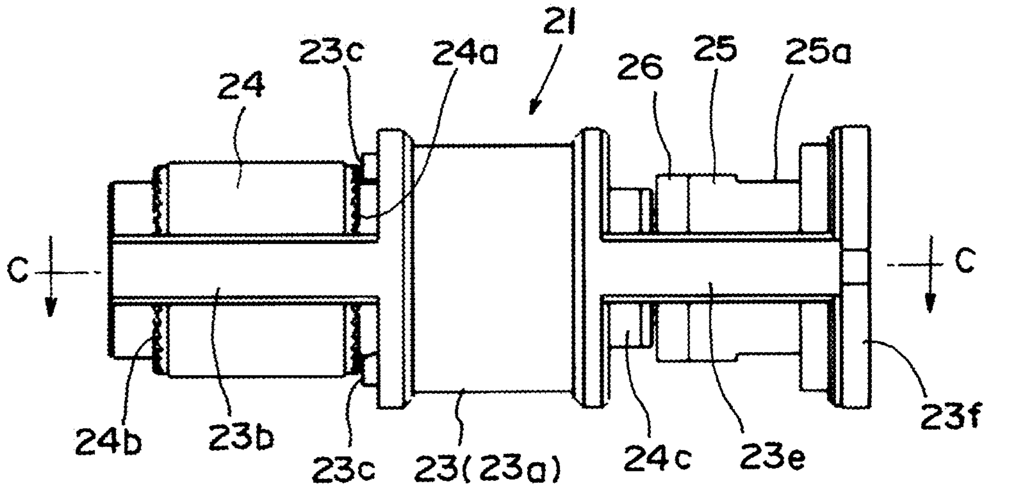
FIG. 7 are a front view and a top view of the rotational drive mechanism shown in FIG. 6.
Figure 7:
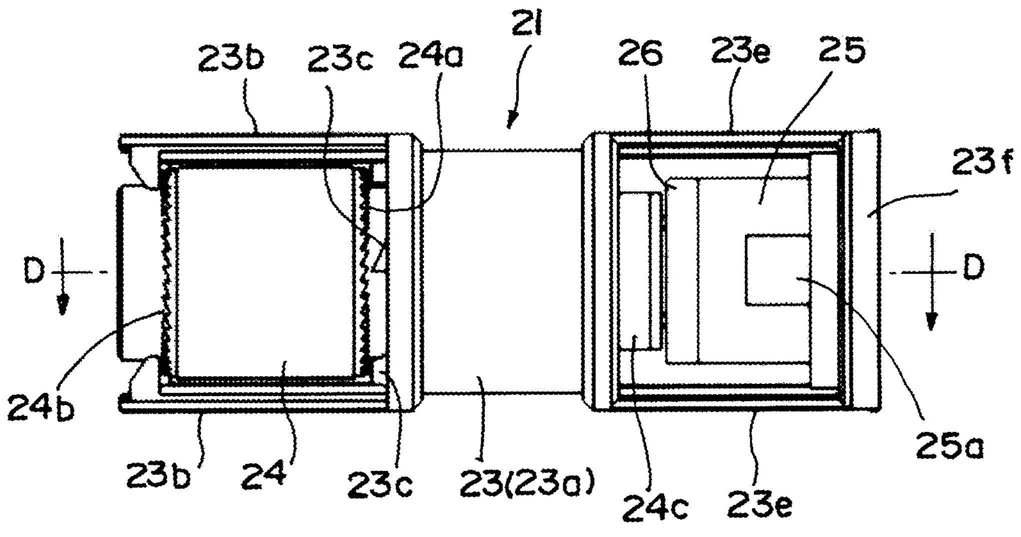
Figure 8:
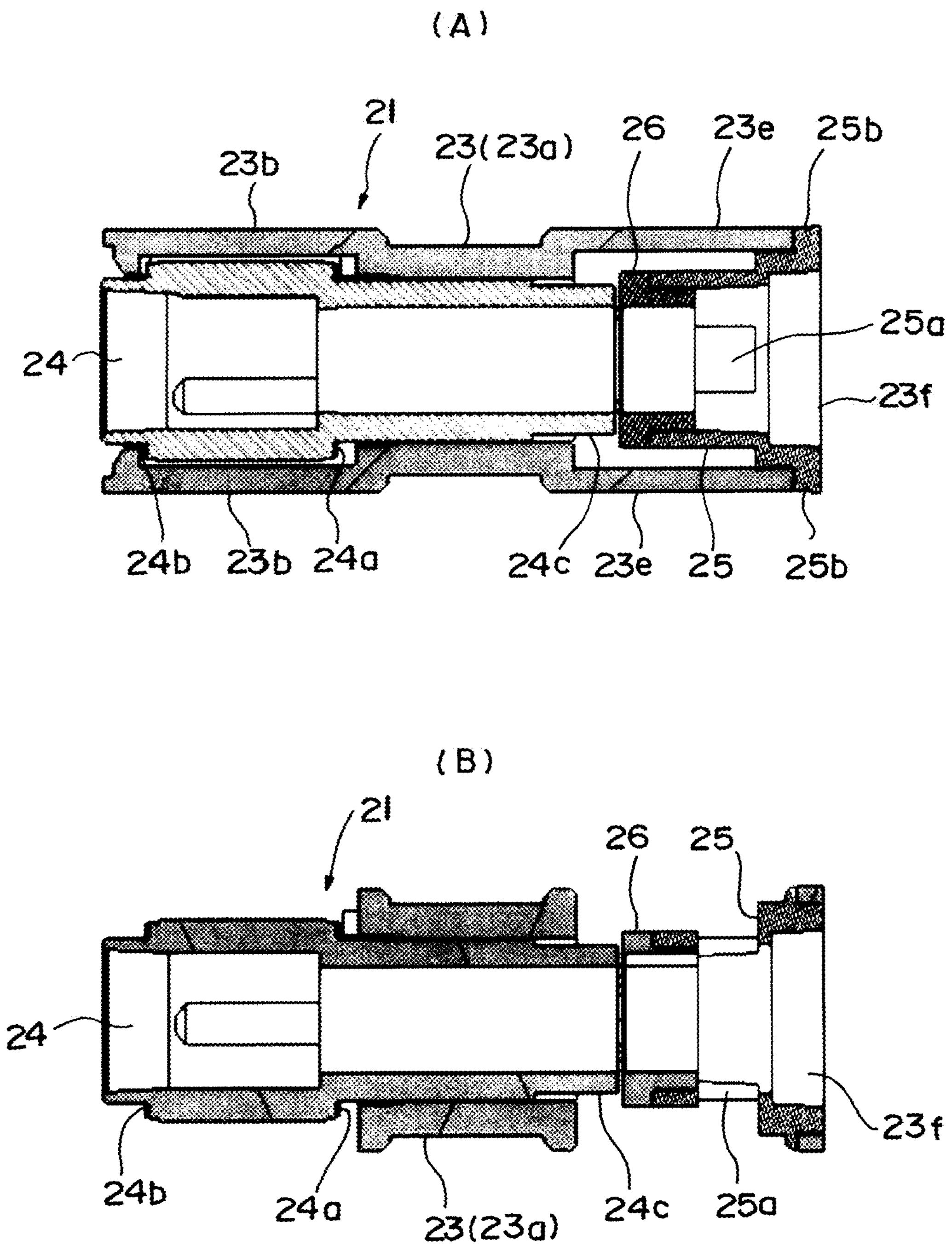
FIG. 8 are sectional views taken in the direction of the arrows along the lines C-C and D-D shown in FIG. 7.

FIGS. 3 to 8 show the unit of the rotational drive mechanism 21 for the writing lead, in which FIGS. 3 to 5 show a half-finished state where the rotatable cam is omitted, and FIGS. 6 to 8 show a finished state where the rotatable cam is mounted. Firstly, as shown in FIGS. 3 to 5, the holder member 23 which constitutes the outer part of the rotational drive mechanism 21 comprises a cylindrical portion 23*a* in the center thereof. An inner periphery of this cylindrical portion 23*a* functions to rotatably support the rotatable cam 24.

A pair of long elastic members 23*b* extending in the axial direction are formed respectively in the positions which are symmetrical about the axis on one end portion side of the above-mentioned cylindrical portion 23*a*, i.e. at the front end side in a situation where the rotational drive mechanism 21 is mounted in the body cylinder. By way of resin mould, the pair of elastic members 23*b* are formed integrally with the above-mentioned cylindrical portion 23*a* in the center and formed to be long and slender to give elastic action.

Further, by way of resin mould, one cam face (hereinafter, may also be referred to as first fixed cam) 23*c* in the shape of a saw tooth is formed integrally with a base end portion of each of the pair of elastic members 23*b* on the cylindrical portion 23*a* side, and a cam peak of this first fixed cam 23*c* is formed to face the tip portion side of the above-mentioned elastic member 23*b*.

Furthermore, by way of resin mould, another cam face (hereinafter, may be referred to as second fixed cam) 23*d* is formed integrally with the elastic member 23*b* at the tip portion of each of the pair of the elastic members 23*b* in the shape of a saw tooth, and a cam peak of this second fixed cam 23*d* is formed to face the cylindrical portion 23*a* in the center. That is to say, the above-mentioned first and second fixed cams 23*c* and 23*d* which are respectively provided at the base end portion and tip portion of the above-mentioned long elastic member 23*b* extending in the axial direction are arranged to face each other.

It should be noted that, in this preferred embodiment, other than the above-mentioned first fixed cams 23*c* provided for the base end portions of the elastic members 23*b*, another pair of first fixed cams 23*c* are formed at an end face of the cylindrical portion 23*a* in the center, whereby the four first fixed cams 23*c* are arranged circumferentially at regular intervals (90-degree intervals).

At the other end side of the above-mentioned cylindrical portion 23*a* in the center, i.e., at the rear end side in a situation where the rotational drive mechanism 21 is mounted in the body cylinder, a ring member 23*f* is formed (by way of resin mould) integrally with the above-mentioned cylindrical portion 23*a* via a pair of supports 23*e* extending in the axial direction.

By means of this ring component 23*f*, the cushion member 25 made of rubber is mounted, and a torque canceller 26 made of resin is attached through this cushion member 25.

The above-mentioned cushion member 25 is formed in the shape of a cylinder, and a pair of opposed windows 25*a* are formed at the cylinder side, thus increasing the resiliency in the axial direction as the cushion member 25.

In this preferred embodiment, as illustrated in FIG. 5(A), the above-mentioned ring member 23*f*, the cushion member 25 made of rubber, and the torque canceller 26 which are arranged in this order are unified using rubber materials, such as an elastomer, by performing two-color moulding between the ring member 23*f* and the torque canceller 26. It should be noted that a portion shown in FIG. 5(A) by reference sign 25*b* indicates a gate position for injecting the rubber material at the time of performing two-color moulding.

The above-mentioned torque canceller 26 has a plurality of hemispherical projections 26*a* formed therein at and along the opposite side to the above-mentioned cushion member 25. The elastic action of the above-mentioned cushion member 24 brings the projections 26*a* into abutment with the rear end portion of the rotatable cam 24 (to be described below) to push out the rotatable cam 24 forward and functions to cause slippage between the projection and the rear end portion of the rotatable cam 24.

FIGS. 6 to 8 show a situation where the rotatable cam 24 is mounted to the holder member 23 having the above-described structure. This rotatable cam 24 is formed in the shape of a cylinder and a large number of saw-tooth cam faces 24*a* and 24*b* that are continuous in a circle are formed respectively on upper and lower end faces which are perpendicular to the axial direction and formed by increasing the diameter at the first half part. It should be noted that hereinafter one group may be referred to as upper cam faces 24*a*, and the other group may be referred to as lower cam faces 24*b*.

Further, as shown in FIG. 8, a smaller-diameter part of the above-mentioned rotatable cam 24 is accommodated in the cylindrical portion 23*a* in the center of the holder member 23, thus constituting a rotation shaft 24*c* of the rotatable cam 24.

Therefore, in order to attach the rotatable cam 24 to the holder member 23, as the rotation shaft 24*c* of the rotatable cam 24 is pushed toward the inside of the above-mentioned cylindrical portion 23*a* of the holder member 23 from the pair of elastic members 23*b* side formed at the holder member 23, the pair of elastic members 23*b* are extended outwards mutually, and the rotation shaft 24*c* is accommodated in the cylindrical portion 23*a*, whereby the rotational drive mechanism 21 shown in FIGS. 6 to 8 can be constituted.

According to the thus constituted rotational drive mechanism 21 for the writing lead, it is arranged that the above-mentioned rotatable cam 24 can rotate together with the chuck 5 about the axis through the connection pipe 7 in a situation where the writing lead is gripped by the chuck 5 as shown in FIGS. 1 and 2. Further, except that the mechanical pencil is in a writing state, the rotatable cam 24 is biased forward through the above-mentioned torque canceller 26 by the action of the above-mentioned rubber cushion member 25 arranged in the rotational drive mechanism 21.

On the other hand, when using the mechanical pencil (i.e., when the writing pressure is applied to the writing lead projecting from the pipe end 9), the above-mentioned chuck 5 retreats against the bias force of the above-mentioned cushion member 25. In conjunction with this, the rotatable cam 24 also retreats slightly in the axial direction. Therefore, the upper cam face 24*a* in the shape of a saw tooth formed at the rotatable cam 24 engages with the above-mentioned first fixed cam 23*c* to be in a meshed state.

In this case, the upper cam face 24*a* and first fixed cam 23*c* which face each other are arranged to have a half-phase (half-pitch) shifted relationship with respect to one tooth of the cam in the axial direction. As described above, since the upper cam face 24*a* engages with the first fixed cam 23*c* to be in a meshed state, the rotatable cam 24 is rotationally driven by half phase (half pitch) of one tooth of the upper cam face 24*a*.

Further, in a situation where the upper cam face 24*a* engages with the first fixed cam 23*c* to be in a meshed state as described above, the lower cam face 24*b* in the shape of a saw tooth and the second fixed cam face 23*d* which face each other are arranged to have a half-phase (half-pitch) shifted relationship with respect to one tooth of the cam in the axial direction.

Therefore, when the writing of one stroke finishes and the writing pressure to the writing lead is released, the rotatable cam 24 is moved forward slightly in the axial direction by the action of the above-mentioned cushion member 25, and the lower cam face 24*b* formed at the rotatable cam 24 meshes with the second fixed cam 23*d*, whereby the rotatable cam 24 is subjected again to the rotational drive corresponding to the half-phase (half-pitch) of one tooth of the lower cam face 24*b* in the same direction.

As described above, according to the above-mentioned mechanical pencil, in conjunction with the reciprocating motion of the rotatable cam 24 in the axial direction caused by the writing pressure, the rotatable cam 24 is subjected to the rotation drive corresponding to one tooth (one pitch) of the upper cam face 24*a* and the lower cam face 24*b*, and the writing lead gripped by the chuck 5 is similarly rotationally driven in one direction through the above-mentioned connection pipe 7 and the above-mentioned chuck 5.

Therefore, the tip portion of the writing lead is always caused to be in the shape of a cone by wearing due to the writing and by the rotational motion applied to itself. Thus, it is possible to prevent the writing lead from being locally abraded as the writing proceeds and allow the writing with a stable line width.

It should be noted that, in the above-mentioned preferred embodiment, the saw tooth shape cams having a vertical plane which rises in the axial direction and a tilt plane which adjoins the vertical plane and slopes at a predetermined angle to the axis direction are respectively employed as the first fixed cam 23*c* and the second fixed cams 23*d* that are formed in the holder member 23. In this case, it is desirable that respective cam peaks, 23*g* and 23*h*, of the above-mentioned saw tooth shape cams which constitute the above-mentioned first fixed cam 23*c* and second fixed cam 23*d* are aligned in the axial direction as shown in FIG.5B.

That is to say, as shown in FIG. 5(B), the vertical planes of the saw tooth shape cam in the above-mentioned first and second fixed cams 23*c* and 23*d* formed at the pair of elastic members 23*b* extending in the axial direction are resin moulded in alignment (or parallel) with a-a line in the axial direction of the holder member 23.

According to this structure, when resin moulding the holder member 23, the vertical plane (edge) of each saw tooth shape cam can be accurately aligned by setting a parting plane of a pair of dies as the a-a line shown in FIG. 5(B), and it is possible to improve the accuracy of meshing with the above-mentioned rotatable cam 24.

In this case, the saw-tooth shape upper cams 24*a* which are continuous and formed in the above-mentioned rotatable cam 24 and the saw-tooth shape lower cams 24*b* which are similarly continuous are preferably arranged to have a half-phase (half-pitch) shifted relationship with respect to one tooth of the cam.

It should be noted that, in the above-mentioned preferred embodiment, although the first and second fixed cams 23*c* and 23*d* formed in the holder member 23 are each made of a saw-tooth shape cam face, it is possible to suitably employ a structure in which a small number of cam faces are arranged continuously to the extent that the cams are formed in the above-mentioned elastic member 23*b*.

As described above, according to the rotational drive mechanism used for the mechanical pencil in accordance with the present invention, it is possible to simplify the cam structure and reduce the number of components, to thereby improve the accuracy of meshing with the cam face. Further, the rotational drive mechanism is allowed to be easily assembled. Thus, it is possible to obtain the operational effects as described in the column of "Effects of the Invention".

Although the above description is carried out with reference to the example of the mechanical pencil in which the writing lead is rotationally driven by using the writing pressure, the present invention can also be applied to a mechanical pencil in which the rotational drive mechanism is driven by using the writing pressure and the writing lead is gradually inched out by using the rotational motion of this rotational drive mechanism. Even if the above-mentioned rotational drive mechanism is used for drive operation in other mechanical pencils, it is possible to obtain similar operational effects.

EXPLANATION OF REFERENCE SIGNS

1: front body (body cylinder)
2: base member
3: lead case
5: chuck
6: clamp
7: connection pipe
8: slider
12: holder chuck
13: chuck spring
18: rear body (body cylinder)
21: rotational drive mechanism
22: body spring
23: holder member
23*a*: cylindrical portion
23*b*: elastic member
23*c*: first fixed cam
23*d*: second fixed cam
24: rotatable cam
24*a*: upper cam
24*b*: lower cam
24*c*: rotation shaft
25: cushion member
26: torque canceller
31: knock bar
32: knock bar spring
34: knock cover

The invention claimed is:

1. A mechanical pencil having a rotational drive mechanism for rotationally driving a rotatable cam based on writing pressure applied to a writing lead and arranged to use rotational motion of said rotatable cam, comprising:

said rotatable cam which constitutes said rotational drive mechanism retreats in an axial direction based on the writing pressure applied to said writing lead and is moved forward in the axial direction by releasing said writing pressure, said rotatable cam including a plurality of upper cam faces continuously formed in a circle on an upper face of said rotatable cam and a plurality of lower cam faces continuously formed in a circle on a lower face of said rotatable cam, the upper and lower faces being perpendicular to the axial direction, said rotational drive mechanism further comprises a first fixed cam and a second fixed cam which are arranged to face each other via the upper and lower cam faces of said rotatable cam, said first fixed cam comprises a single cam face which meshes with a part of the plurality of upper cam faces of said rotatable cam so as to rotationally drive said rotatable cam in one direction as said rotatable cam retreats in the axial direction, and said second fixed cam comprises a single cam face which meshes with a part of the plurality of lower cam faces of said rotatable cam so as to rotationally drive said rotatable cam in said one direction as said rotatable cam moves forward in the axial direction.

2. A mechanical pencil as claimed in claim 1, wherein said first fixed cam and second fixed cam are formed integrally with a holder member.

3. A mechanical pencil as claimed in claim 2, wherein elastic members are formed integrally with said holder member to extend in the axial direction, and said first fixed cam and second fixed cam are formed integrally with part of said elastic members in a longitudinal direction.

4. A mechanical pencil as claimed in claim 1, wherein cam peaks of said first fixed cam and second fixed cam are formed to be in alignment with each other in the axial direction.

5. A mechanical pencil as claimed in claim 2, a cylindrical portion for rotatably supporting said rotatable cam is formed at said holder member.

6. A mechanical pencil as claimed in claim 2, wherein cam peaks of said first fixed cam and second fixed cam are formed to be in alignment with each other in the axial direction.

7. A mechanical pencil as claimed in claim 3, wherein cam peaks of said first fixed cam and second fixed cam are formed to be in alignment with each other in the axial direction.

8. A mechanical pencil as claimed in claim 3, wherein a cylindrical portion for rotatably supporting said rotatable cam is formed at said holder member.

9. A mechanical pencil as claimed in claim 4, wherein a cylindrical portion for rotatably supporting said rotatable cam is formed at said holder member.

* * * * *